United States Patent [19]

Tucker

[11] Patent Number: 4,693,806
[45] Date of Patent: Sep. 15, 1987

[54] CHLORINE GENERATOR DEVICE

[76] Inventor: Daniel M. Tucker, 1981 Chateau Ct., Walnut Creek, Calif. 94598

[21] Appl. No.: 778,971

[22] Filed: Sep. 23, 1985

[51] Int. Cl.⁴ ............... C25B 1/26; C25B 9/00; B01D 21/30
[52] U.S. Cl. .................. 204/252; 204/263; 204/265; 204/266; 210/137; 210/167; 210/192
[58] Field of Search ............ 204/98, 128, 263–266, 204/256, 258; 210/137, 167, 192

[56] References Cited

U.S. PATENT DOCUMENTS

| | | | |
|---|---|---|---|
| 4,086,393 | 4/1978 | Hart | 204/128 X |
| 4,136,005 | 1/1979 | Persson et al. | 204/266 |
| 4,308,123 | 12/1981 | Lynn | 204/266 |
| 4,329,215 | 5/1982 | Scoville | 204/258 X |
| 4,472,256 | 9/1984 | Hilbig | 204/266 |
| 4,496,452 | 1/1985 | Bianchi | 204/266 |
| 4,500,404 | 2/1985 | Tucker | 204/263 X |

Primary Examiner—Donald R. Valentine
Attorney, Agent, or Firm—Roger A. Marrs

[57] ABSTRACT

A chlorine generating apparatus is disclosed herein by which chlorine gas and/or sodium hypochlorite is generated in small quantities from a brine solution economically enough to be practical for use in the backyard swimming pool. The apparatus includes a freestanding unit utilizing only salt, water and electricity as its raw materials to generate the chlorine required. A chlorine-generating electronic cell incorporates a pumping action for forcibly urging the resulting product through a mixing unit to a storage tank without the use of mechanical pumps. A process is included whereby hardness minerals are precipitated from incoming raw water preventing mineral buildup on the cathode portion of the electronic cell.

4 Claims, 4 Drawing Figures

POOL WATER

CHLORINE GENERATOR DEVICE

BACKGROUND OF THE INVENTION

1. Field of the Invention

The present invention relates to an apparatus and method for generating sodium hypochlorite and/or chlorine gas from a brine solution in small quantities to be suitable and economical for backyard swimming pool use. The concept can also be expanded for larger commercial installations. The purpose of the invention is to replace the need to haul dangerous, toxic and poisonous chemicals from a store to the pool owner's home, store them where they might accidentally cause damage or loss of human life, and eliminate the need to continuously dispense these chemicals in uncertain proportions into the swimming pool.

2. Brief Description of the Prior Art

It is a well-known fact that for a swimming pool to be used safely the water must be sterile. In addition, if proper disinfectant or algaecide is not applied, the growth of algae will damage the pool surface and clog the pool filters. More often than not, the home swimming pool is a breeding ground for disease. Several current methods of chlorinating the home swimming pool are now in use.

One method is the adding of chlorine solution, normally a diluted solution of sodium hypochlorite. This is carried from the store in gallon bottles and dispensed manually by the user.

Another method is the use of powdered chlorine chemicals which may be added by hand or dispensed through a means of a hopper or supplied in stick form which slowly dissolves into the pool water either in a dispenser container or in some sort of floating element that rides on the pool surface.

Yet another method which is becoming more popular, even though it presents the greatest hazards, is the use of gas chlorine. Normally, a service company chlorinates the pool once a week by dispensing chlorine gas into the water and adding soda ash or some equivalent base to counteract the acid induced by the chlorine. Since the dispensing of the chlorine gas is done infrequently, i.e., once per week, the chlorine level is raised to a very high point at that time so that it will not drop below that required to maintain proper pool function within a week's time. This very high initial concentration of chlorine in the water adversely affects swimmer's tans and bleaches hair as well as bathing suits.

In all these instances, caustic chemicals must be transported to the pool site and in many cases bottled or boxed chemicals are left stored where they can be accidentally reached by children.

Many prior attempts have been made to generate the chlorine at the pool site. The most common of these utilize salt within the pool water itself and bypass a small portion of the filtered flow through an electrolysis cell which generates the chlorine. This prior system has not been satisfactory due to the continuous problem of the hardness minerals within the pool water precipitating and eventually clogging and damaging the cell. A number of methods have been employed by which this hardness could be removed through acid washing of the cell between pool use. However, this procedure requires complex automatic equipment or manual operation by the pool owner. In the former case, the equipment is too elaborate and complex to be practical for the home use application. In the latter case, the pool owner often as not would forget to operate the equipment and the cell would be destroyed. The problem is further compounded by the large amount of salt that has to be added to the pool water bringing the salinity content to the point where corrosion and electrolysis in the pool's plumbing system were often out of control.

Another objection to previous units is the amount of electricity required to operate the electrolysis cell since the salt concentration within the cell had to be kept low, usually less than 1%. A great deal of the electrical energy went into the production of hydrogen and oxygen, a wasteful by-product in this application. With the cost of energy steadily increasing, this method of production is simply not cost-effective.

SUMMARY OF THE INVENTION

This invention is an apparatus and a process whereby sodium hypochlorite and/or chlorine gas are produced in small controlled quantities to be used in a safe and costeffective way for sterilizing water. The apparatus contains the following component parts: (a) a power supply, (b) a reservoir for storage of raw water, (c) a brine solution container, (d) means for supporting an electrolytic cell on the container consisting of an anode chamber connected to the brine container, a cathode chamber and an ion selective membrane separating the two chambers, (e) a mixing manifold (f) coupled to the cathode chamber, a storage container (g) operably connected to the manifold to store sodium hyperchlorite before it is dispensed and an isolation valve (h) to separate the entire system from the water and/or equipment to be sterilized.

The anode chamber of the electrolytic cell is large enough to hold a sufficient quantity of saltwater brine to last for several months of normal operation. The ion selective membrane will, during the electrolysis process, pass only sodium and hydrogen ions to the cathode chamber. Chlorine gas and oxygen are generated in the anode chamber eventually creating enough pressure to force or pump the gases into the bottom of the mixing manifold.

Sodium hydroxide and hydrogen gas are produced, during electrolysis, in the cathode chamber. The hydrogen is used to pump the liquid and then immediately allowed to escape to the atmosphere. The sodium hydroxide is collected in the container holding the cell. During operation a continuous supply of raw water, from the reservoir, is added to the container holding the cell. This continuous addition of raw water creates an excess solution of sodium hydroxide. The excess is channeled through the mixing manifold where it is combined with the chlorine gas to produce sodium hypochlorite which is then stored in the storage container until used.

The electrolysis within the cell is accomplished by passing current through the cell which is generated by a power supply that forms an integral part of the apparatus.

A unique and novel method is used within this process to remove hardness minerals from the raw water before the water comes in contact with the cathode. This method consists of mixing the raw water with the sodium hydroxide in the container holding the cell. The raw water is added at the surface and thoroughly mixed before reaching the cathode which is submerged near the bottom of the container. Because sodium hydroxide is a concentrated base solution with a high PH factor, the dissolved minerals are precipitated out of the water before the water comes in contact with the cathode.

By generating sterilizing media in site on a continuous basis, the invention also provides sanitation and protection far in excess of that normally afforded in home pool usage. Operation of the invention is easily understood and the unit may be rapidly installed by moderately skilled labor and operated by the normal unskilled homeowner. It is among the primary objectives of this invention to provide a device which develops chlorine and its sterilizing by-products directly from a concentrated brine solution and to dispense them into a swimming pool for sterilization purposes.

It is a further objective of this invention to make such dispensation automatically on a daily basis in order to maintain a proper sterility level in the pool at all times.

It is a further objective of this invention to control the PH of the pool water by removing part of the sodium hydroxide from the cathode side of the container and disposing of it to waste.

It is a further objective of this invention to automatically dispense chlorine solution into the pool through the filtering system by the novel combination of an isolation valve and a storage container embodying a needle-type float valve.

It is yet another objective of this invention to introduce mineral-laden pool or tap water, in small quantities, to the cathode side of the container and to precipitate harmful calcium, magnesium, carbonates and other minerals to the bottom of the container. These hardness minerals will periodically be discharged to waste. Since calcium and magnesium commonly cause stains on pool plaster and damage pool equipment, removing them, even in small quantities, is beneficial.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF THE PREFERRED EMBODIMENT

The following detailed description is on the best presently contemplated modes of carrying out the invention. This description is not to be taken in a limiting sense but is made merely for the purpose of illustrating the general principles of the invention since the scope of the invention is best defined by the appended claims.

Figure 1:
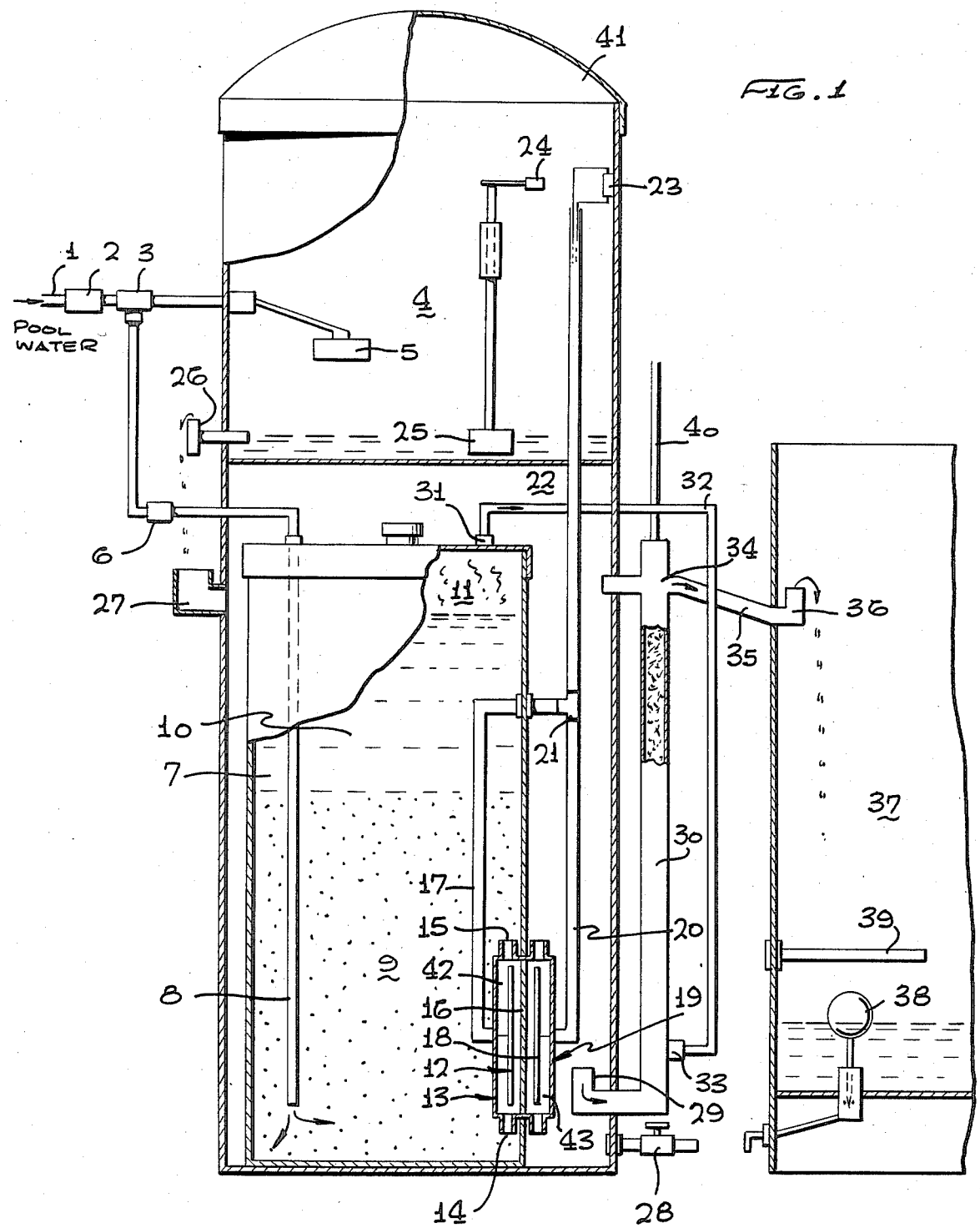
FIG. 1 is a diagrammatic illustration of a novel chlorine generator apparatus incorporating the present invention.

Referring now to FIG. 1, it can be seen that tap or pool water enters conduit (1) to a check valve (2) when pool water is used to prevent the filter system from sucking air during the off cycle. A "T" valve (3) allows pool water to enter either a reservoir (4) through a float valve (5) which controls the upper limits of the water level in the reservoir and prevent overflow or to refill a valve (6). When the refill valve (6) is open, the water enters a brine tank (7) through an extended tube (8) which prevents chlorine gas from backing up to refill valve (6). A quantity of salt (9), water (10) chlorine gas (11) and oxygen are contained in vertical layers in the brine tank (7) under a small amount of pressure. The pressure is caused by the generation of chlorine gas and oxygen at the surface of a cell having an anode (12) which is enclosed in an anode housing (13) with a bottom opening (14) and a top opening (15) so as to generate a pumping action as the gases travel through the cell.

A selective ion membrane (16) allows sodium and hydrogen ions to pass from an anode chamber (42) to a cathode chamber (43). A wire carrying a low voltage positive direct current is connected from a power supply (23) to the anode (12) through a sealed tube (17). A cathode (18) is connected to a low voltage negative of the power supply (23) by a wire which passes through the sealed cathode cell housing (19) to the sealed tube (20) that joins the anode wire at a "T" connection (21) and proceeds through a cathode tank (22), through the reservoir (4) to the power supply (23). A safety micro switch (24) connected to a float (25) in the reservoir (4) will shut off the power source to the power supply (23) when the reservoir water level drops below a predetermined level. An adjustable dripper valve (26) in the bottom of the reservoir (4) controls the rate at which the pool water drips into the catch basin-hydrogen vent (27).

The water enters at the surface level of the liquid in the cathode tank (22). A drain valve (28) is used manually to discard the precipitated pool hardness minerals to waste. This valve could also be hooked up to an automatic feed pump, or a gravity drip discharge, to remove a portion of the caustic chemicals to waste. By removing a portion of the caustic chemicals, the PH of the effluent can be controlled, thus having an effect on the PH of the pool water. A raised pick-up pipe (29) removes the sodium hydroxide solution from cathode chamber (43) to the mixing chamber (30) which is filled with media that increases the contact time between the sodium hydroxide solution and the chlorine gas. Chlorine gas exits the brine tank (7) at port (31) through tube (32) under a small amount of pressure which forces it to enter the lower portion of the mixing chamber (33). As the chlorine gas passes through the sodium hydroxide solution a chemical reaction takes place producing sodium hypochlorite or chlorine solution. This liquid exits the mixing chamber at a cross fitting (34), travels slightly downhill via tube (35) to a "chlor stor" liquid trap (36), then drips into a "chlor stor" tank (37). A float valve (38) prevents the pool filter pump from sucking all the liquid out of the tank (37) and sucking air which could cause the pump to burn out. Float limit bar (39) keeps a float valve (38) from raising too far out of its seat when the tank fills to its upper limit.

Gas vent (40) removes unmixed chlorine gas and oxygen to the outside atmosphere. Transparent protective dome (41) is used to protect the power supply from weather.

After the chlorine solution generator has manufactured its product, there are a number of ways the liquid solution can be dispensed to the pool.

Figure 2:
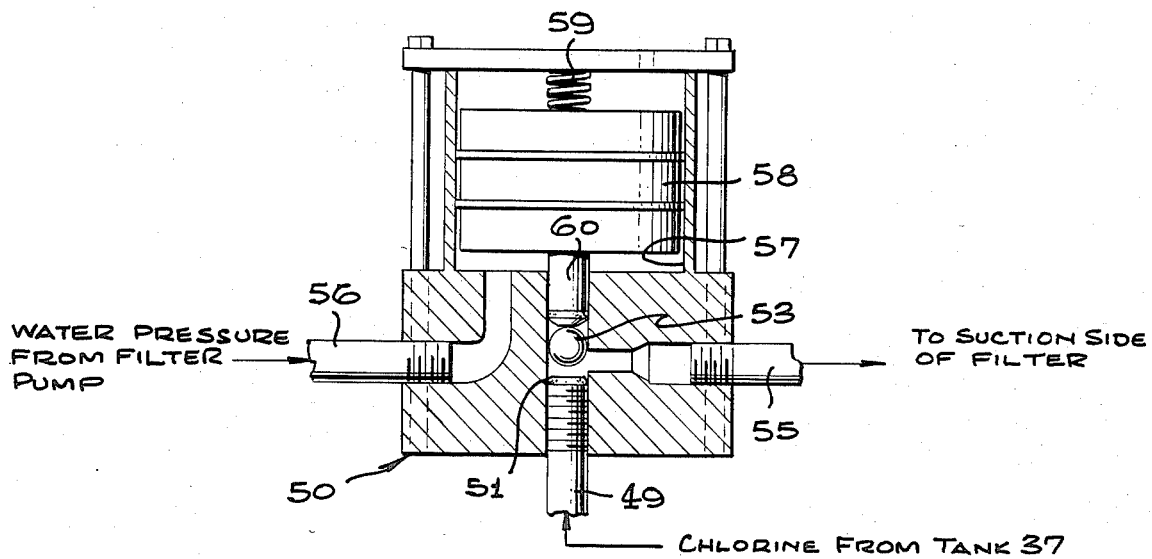
FIG. 2 is an enlarged sectional view of an isolation valve employed in the apparatus of FIG. 1.

One way is to have the chlorine solution drawn into the pool circulating system by the suction of the pool filter pump. A simple combination of floats and valves has been invented to do this. Referring now to FIG. 2, chlorine solution coming from the tank (37) via conduit (49) enters a base of an isolation valve (50) and passes through an "o" ring (51) around a loose ball (53) then exits the isolation valve through a tube (55) that is connected to the suction side of the filter system pump. Pool water coming from the pressure side of the filter pump enters the pipe (56) of the isolation valve, then enters a cylinder chamber (57). Pressure from the filter pump moves a piston (58) back against a spring (59) overcoming pressure that keeps a piston plunger (60) against the ball (53). Thus, the isolation valve is always in the off or shut position unless pressure opens it.

Figures 3, 4:
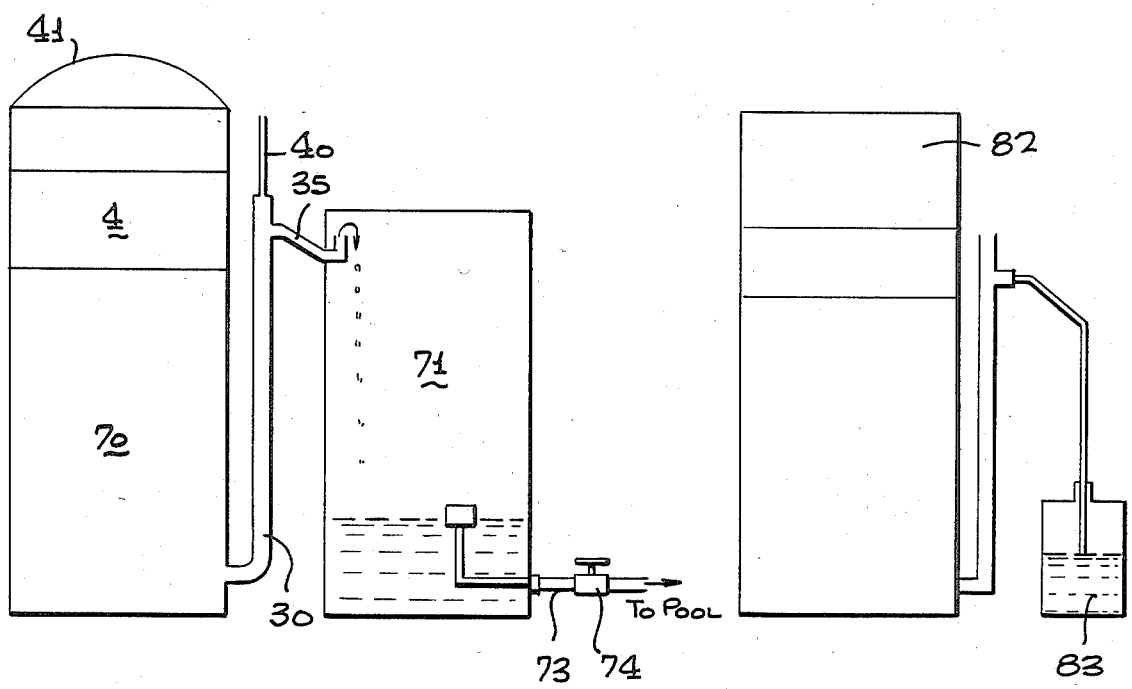
FIG. 3 is a schematic illustration showing an alternate device for dispensing chlorine solution generated by the apparatus of FIG. 1 to a swimming pool.
FIG. 4 is another version of a dispensing means for the generated chlorine solution.

Referring now to FIG. 3, another way that the chlorine solution generator can dispense its chemicals into the pool is to have the chlorine solution generator (70) produce its chemicals and dispense them into a holding tank (71). A tube (73) going from an optional dripper valve (74) to the pool would allow the chlorine solution to drip into the pool as it was manufactured by the chlorine solution generator.

Referring now to FIG. 4, yet another way that the chlorine solution generator's chemicals can reach the pool (or any other application that uses chlorine solution, i.e., drinking water sterilization, food processing, bleaching of clothing, etc.) would be to have the chlorine solution generator use water that is manually poured into its reservoir (82), then drip the resulting chlorine solution into a reusable container (83) that could easily be transported to the point of use and returned to refill at the user's option.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A liquid sodium hypochlorite and/or chlorine generating device comprising:
   a tank containing a saturated solution of sodium chloride with an electrolytic cell incorporated into the wall thereof;
   said cell containing an ion selective membrane separating the anode and cathode compartments such that the brine solution is present only in the anode compartment of said cell;
   said tank submerged in a larger tank filled with water such that the cathode compartment of said cell communicates directly with the water in said larger tank;
   said ion selective membrane to pass only hydrogen and sodium ions from said anode compartment to said cathode compartment thus converting the water in said larger tank to a sodium hydroxide solution;
   a means of removing the hardness from incoming water by causing it to drip into the said sodium hydroxide solution in said larger tank;
   said sodium hydroxide solution causing precipitation of the hardness minerals in said incoming water;
   a source of direct current, the positive output thereof connected to the anode of said electrolytic cell, and the negative output thereof connected to the cathode of said electrolytic cell.

2. A liquid sodium hypochlorite and/or chlorine generating device comprising:
   a tank containing a saturated solution of sodium chloride with an electrolytic cell incorporated into the wall thereof;
   said electrolytic cell to be installed with the anode portion within the saturated brine solution and the cathode portion external to said tank with an ion selective membrane separating said anode and cathode sections;
   said ion selected membrane to allow the passage of sodium and hydrogen ions only from the anode to the cathode side of said electrolytic cell;
   said tank of saturated sodium chloride solution placed in a larger tank filled with water which then communicates directly with the cathode side of said electrolytic cell;
   the action of said cathode side of said electrolytic cell and the ion exchange membrane passing only sodium and hydrogen ions converting the solution in said larger tank to a solution of sodium hydroxide;
   the hydrogen produced at the cathode of said electrolytic cell rising to the surface of the solution in said outer tank is able to dissipate rapidly from a large surface area reducing the intendent danger caused by a concentration of said hydrogen gas.

3. A liquid sodium hypochlorite and/or chlorine generating device comprising:
   a means for generating liquid sodium hypochlorite;
   a storage container for said liquid sodium hypochlorite;
   an isolation valve to control vending of said sodium hypochlorite from said storage container to a swimming pool circulation system or water circulation system in which liquid sodium hypochlorite is to be introduced to perform sterilization of said water circulating system;
   said isolation valve to allow vending of said liquid sodium hypochlorite solution to said circulating system only when said circulating system is active;
   said activity to be determined by the pressure differential produced by the pump in the said circulating system such that an attachment to the affluent side of said pump in said circulating system is connected to said isolation valve to cause the valve to open as a result of the pressure generated by said pump with the opening of said isolation valve allowing the vending of said liquid sodium hypochlorite into said circulating system;
   said isolation valve to be responsive only to the pressure generated as a result of liquid flowing through said pump such that should said pump lose its prime and cease to cause circulation as a result of air or other gas captured within said pump, said isolation valve would have inadequate pressure to allow the vending of said liquid sodium hypochlorite into said circulating system.

4. A chlorine generating device, according to claim 3, wherein:
   the container for said liquid sodium hypochlorite contains a float valve so constructed so as to close the output of said container to said isolation valve should the level of said liquid sodium hypochlorite in said container become low enough such that further withdrawal of said liquid sodium hypochlorite could result in the suction of air through said isolation valve into said circulation system causing said pump of said circulation system to lose its prime.

* * * * *